March 6, 1962 J. R. KUKSA 3,024,317

DIGIT ABSORBING SELECTOR

Filed Nov. 2, 1959 2 Sheets-Sheet 1

INVENTOR.
John R. Kuksa
BY C. A. Gulbrandsen
Atty.

March 6, 1962
J. R. KUKSA
3,024,317
DIGIT ABSORBING SELECTOR
Filed Nov. 2, 1959
2 Sheets-Sheet 2

INVENTOR.
John R. Kuksa
BY C. A. Gulbrandsen
Atty.

United States Patent Office 3,024,317

Patented Mar. 6, 1962

3,024,317

DIGIT ABSORBING SELECTOR

John R. Kuksa, Chicago, Ill., assignor to Automatic Electric Laboratories, Inc., a corporation of Delaware Filed Nov. 2, 1959, Ser. No. 850,229

9 Claims. (Cl. 179—18)

This invention relates in general to a telephone system and more particularly to selector switches of the Strowger type for digit absorbing.

In small telephone sub-offices where it is desirable to utilize digit absorbers to refrain from installing extensive equipment, the problem arises in the office code numbers for absorption thereof. That is, it has been impossible in the past using a known digit absorber to absorb and cut in if the digits follow certain sequences or patterns, except by using a series of absorbers. Codes such as "1212" or "333" could not be handled by a single digit absorber if the call was to cut in on the last of these named codes (last "2" or last "3"), therefore requiring the sub-office to use a more suitable code for absorption. However, with the universal dialing system requiring each sub-office to have a different code in a given area, some sub-offices are forced to accept what codes are available which include these difficult digits to absorb.

It is therefore an object of this invention to provide an economical digit absorbing selector capable of absorbing and cutting in on normally difficult code digits having a set sequence.

A feature of this invention resides in the utilization of a terminal bar adjacent a vertical bank for wire strappings, in combination with a marking relay which rearranges the marking paths of the wire strapping extending to certain relays.

Another feature of the invention in combination with the above feature resides in the utilization of a preparatory two-step switch through relay which fails to operate, partially operates, or fully operates as determined by the rearranged marking paths.

Other objects and features of this invention will become apparent from a perusal of the following specification taken in combination with the accompanying drawings, of which:

Figure 2:
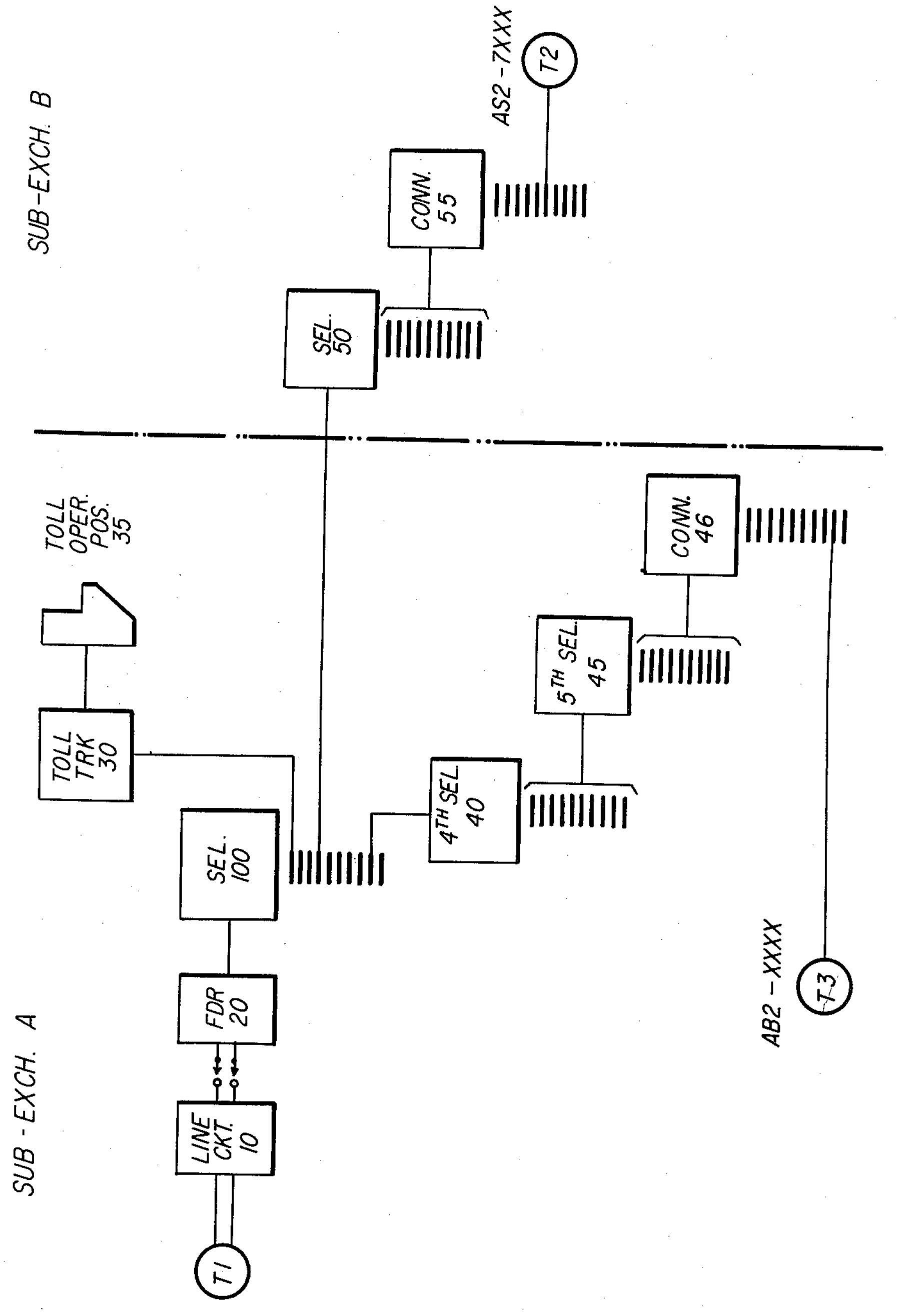
FIGURE 2 shows a trunking diagram employing the selector into a telephone system.

Referring briefly to the trunking diagram of FIGURE 2, a 10,000 line exchange A is shown adjacent a smaller 1000 line exchange B. Sub-exchange A having the directory code AB2, or 222, will require the absorption of the first two digits "22" on local calls, while cutting in to a fourth selector on the third digit "2" prior to dialing the remainder of the directory number wanted.

For explanation purposes, sub-exchange A shows one of the numerous substations T1 of a conventional type having a telephone handset and dial. A line circuit 10 also of a conventional type is associated with the substation T1, as well as a finder 20 for finding the calling line. Linked to the finder 20 is the digit absorbing selector 100 more fully shown in FIGURE 1, to be hereafter more fully described. Connected to the tenth level of bank contacts on selector 100 are toll trunks, such as 30, linked to toll operators positions, such as 35. Connected to the second level of bank contacts of selector 100 are fourth selectors, such as 40 accessible to fifth selectors, such as 45, and connectors such as 46. Connected to the seventh level of bank contacts on selector 100 are fifth selectors extending to the sub-exchange B, all of conventional Strowger design.

Sub-exchange B having the directory code AS2-7 or 2727, will require the absorption of the first three digits "272" on local calls or calls from sub-exchange A while cutting in to a fifth selector on the fourth digit "7," prior to dialing the remainder of the directory number wanted. For the benefit of local subscribers a first digit "7" can be dialed to cut-in, thus bypassing the normally absorbed digits "272."

Figure 1:
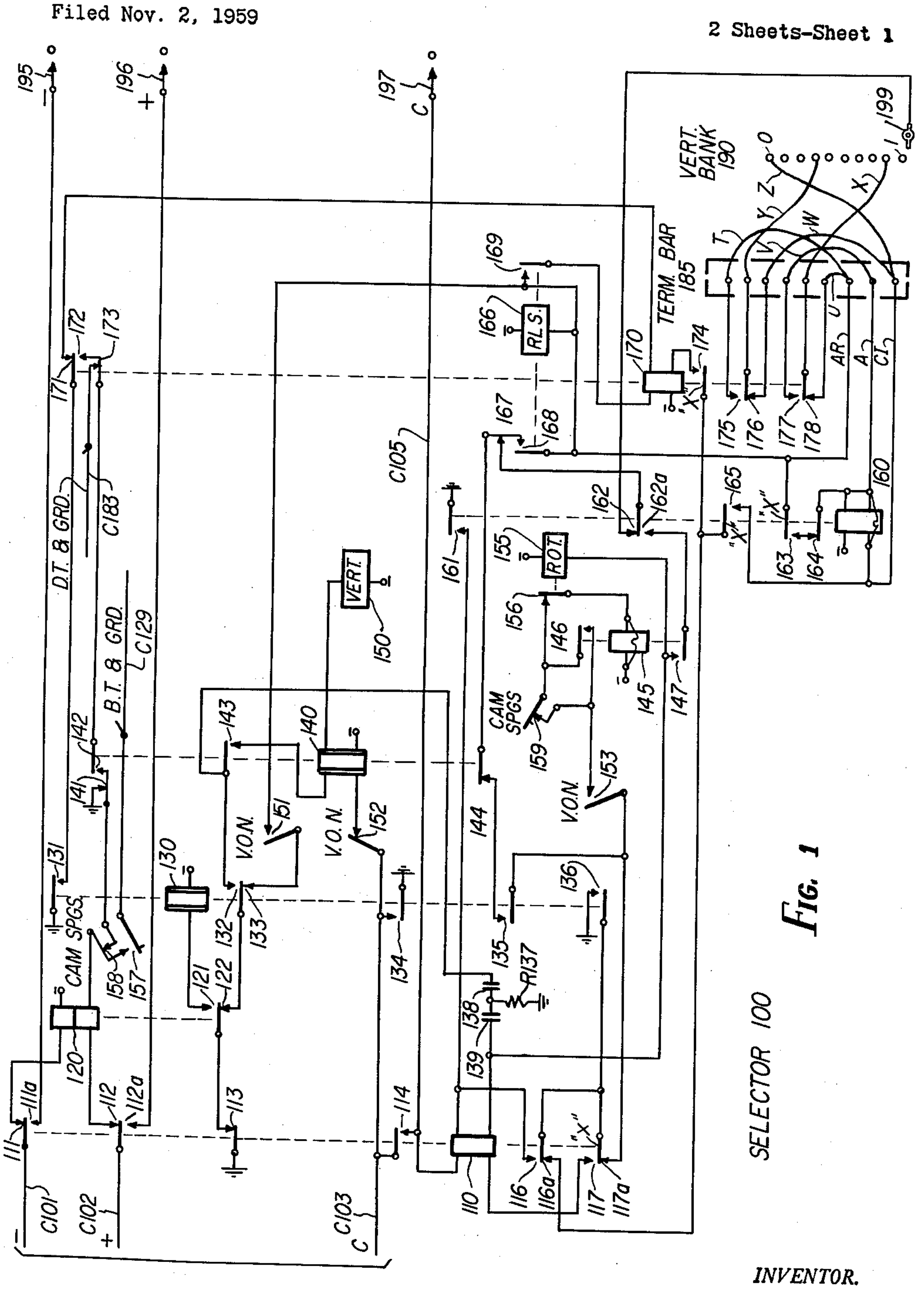
FIGURE 1 shows the digit absorbing selector containing the crux of this invention.

Reference will now be briefly made to the digit absorbing selector 100 shown in FIGURE 1. The selector 100 is of the two-motion wiper selective type, and includes an auxiliary wiper 199 which steps only vertically onto bank contacts of a vertical bank 190. The vertical movement of the wipers 195–197 and 199 are under the control of a vertical magnet 150, and the rotary movement of the wipers 195–197 are under the control of a rotary magnet 155, operations well known in the art. The release of the wipers to their normal position are under the control of a release magnet 166. Adjacent to the vertical bank 190 is a terminal bar 185 having nine terminals for connecting wire strappings between certain terminals thereon, as well as to certain bank contacts on the vertical bank 190. Also, wire strappings are also connected to terminals on the terminal bar 185 extending to contacts of a marking relay 170, which when operated, changes the marking polarity to certain terminals via the strappings. The polarities are controlled over conductors CI, A and AR connected respectively to the first, second and third terminals of the terminal bar 185. These polarities are battery in each case namely, battery through both windings of the relay 160 on conductor CI, battery through the upper winding of relay 160 on conductor A, and battery through the release magnet 166 on conductor AR. These conductors are appropriately lettered to designate, CI for "cut-in," A for "absorption," and AR for "automatic release." Relay 160 is a two-step relay and must be energized through both windings via conductor CI to initiate cut-in of selector 100 to a succeeding switch. An energization only through the upper winding of relay 160 via conductor A will be sufficient to only operate the preliminary make or "X" contacts, which will in turn close a circuit to the release magnet 166, but the relay 160 will thereafter fully operate to permit cut-in on the subsequent dialed digit. Release magnet 166 upon being energized over conductor AR will restore the wipers and absorb the dialed digit. With the straps T, U, V, W, X, Y, and Z and the marking relay 170, the cut-in, absorption and release digits are not necessarily the same upon each receipt thereof. For instance, in the normal position shown in the drawing the digit "2" (second contact on vertical bank 190) is an "AR" digit, and the digits "7" and "0" are both "CI" digits, with no digit shown corresponding to an "A" digit. However, when the marking relay 170 operates upon receipt of an "AR" digit, digit "2" becomes an "A" digit, and digit "7" becomes an "AR" digit. A better understanding of these operations will become apparent from a detailed description to follow.

Thus too, with the digit absorbing briefly described the selector 100 will act as a combination first, second, third or fourth selector.

*Seizure*

Assuming that a subscriber at the substation T1 desires to make a call, the removal of the handset closes a loop circuit to a line circuit 10 in a conventional manner, to start a line finder 20 to search for the calling line. A line finder such as 20, will search and connect the calling line loop to the selector 100 in a well-known manner, whereby line relay 120 will operate.

The line relay 120 operates over a circuit comprising battery, upper winding of relay 120, contacts 111, negative conductor C 101, through the calling party's loop, positive conductor C 102, contacts 112, lower winding of relay 120, cam contacts 158, and contacts 141 to ground. Also upon the seizure of the selector 100, a ground is forwarded over the control conductor C 103 via VON contacts 152 to operate the relay 140 which closes contacts 142 and opens contacts 141 to replace the ground for the relay 120 with dial tone having superimposed ground via contacts 173 and conductor C 183. At contacts 143 the relay 140 prepares a locking circuit for itself and prepares a pulsing circuit for the vertical magnet 150. At contacts 144 the relay 140 opens a prepared ground to the vertical wiper 199. The line relay 120 in operating closes at contacts 121 an obvious circuit to the relay 130.

The relay 130 operates and closes contacts 131 to prepare a circuit to the relay 170. Contacts 132 close to prepare a pulsing circuit to the vertical magnet 150 as well as a holding circuit for the relay 140. Contacts 134 close ground to the control conductor C 103 to mark the selector 100 busy to other calls and holds the preceding equipment as well as the relay 140. Contacts 153 and 136 close to prepare circuits to the rotary interrupt relay 145 and the rotary magnet 155.

Upon receipt of the dial tone the calling subscriber may proceed to dial.

*Toll Call*

In order to make a toll call, the digit "0" must be dialed into the selector 100, whereby a toll trunk linking a toll operator will answer to complete the call.

Upon receipt of the ten impulses, the line relay 120 will intermittently restore and operate ten times. The line relay in restoring opens intermittently at contacts 121 the circuit to the relay 130 however, the relay 130 is of the slow-to-release type and will remain operated throughout pulsing. Contacts 122 will intermittently close to intermittently energize the vertical magnet 150 and the upper winding of the relay 140.

The vertical magnet 150 upon being pulsed will step the wipers 195, 196, 197, and auxiliary wiper 199 one step for each pulse received. Upon these wipers taking their first vertical step the vertical-off-normal springs will be actuated whereby; VON contacts 151 close to prepare a circuit to the release magnet 166; VON contacts 152 opens the original operating circuit to the relay 140; however, relay 140 being of the slow-to-release type will remain operated through its upper winding during pulsing and VON contacts 153 close a circuit to the rotary interrupt relay 145. This last circuit extending from battery winding of relay 145, contacts 156, 159, 153, 117*a*, and 136 to ground. Relay 145 operates, closes at contacts 146 an alternate path for its operation bypassing the cam spring contacts 159. Contacts 147 close to further prepare a circuit to the rotary magnet 155.

At the termination of the first dialed digit the wipers 195–197 and 199 will have been stepped to their respective tenth vertical position, and with the line relay 120 fully operated the circuit to the slow-to-release relay 140 is opened at contacts 122. The vertical or auxiliary wiper 199 engages the tenth bank contact, and with the eventual release of the slow-to-release relay 140 will close at contacts 144 a circuit to the two-step relay 160. This last circuit extending from battery, upper and lower windings of relay 160, conductor CI, first contact on terminal bar 185, strap Z, tenth contact on the vertical bank 190, wiper 199, contacts 162, 167, 144, 135, 117*a*, and 136 to ground. Also, in restoring, relay 140 opens contacts 142 to remove the dial tone from the calling loop and at contacts 141 closes ground to maintain the line relay 20 operated. Contacts 143 open to prevent further operation of the vertical magnet 150.

The two-step relay 160 operates, closing its preliminary or "X" contacts first whereby, "X" contacts 163 close without effect however on this type of call, "X" contacts 165 close a locking circuit for relay 160 via contacts 116*a* and 136 to ground. Thereafter, the remaining contacts of the two-step relay 160 are actuated whereby, contacts 161 closes ground to the control wiper 197 via the upper windings of the switch-through relay 110. Contacts 162 open to remove ground from the auxiliary wiper 199, and transfers this ground by closing contacts 162*a* to energize rotary magnet 155 via contacts 147. Contacts 164 open however, without effect on this type of call.

The rotary magnet 155 energizes opening its contacts 156 and rotates the wipers 195, 197 to the first set of bank contacts on the tenth level. The opening of contacts 156 opens the circuit to the rotary interrupt relay 145 causing deënergization thereof. In restoring relay 145 interrupts at contacts 147 the circuit to the rotary magnet 155. Rotary magnet 155 restores and at contacts 156 recloses the circuit to the relay 145, providing the switch-through relay 110 does not operate. When the control wiper 197 engaged its first bank contact in search of an idle toll trunk, if an idle trunk is engaged, wiper 197 will contact battery to operate trunk switch-through relay 110. However, if a busy toll trunk is engaged control wiper 197 will engage ground whereby relay 145 will reoperate in sequence with rotary magnet 155 until an idle trunk is found in the manner above described.

Assuming that no idle toll trunk is found the wipers 195, 196 and 197 will rotate to the eleventh rotary or overflow position causing the cam springs to be actuated whereby; cam contacts 158 will open the holding ground for the line relay 120, while closing cam contacts 157 to return busy tone to the calling subscriber via conductor C 129, and cam contacts 159 open the circuit to the rotary interrupt relay 145. When the rotary magnet 155 energized on the eleventh rotary step and opened at contacts 156 the circuit to the rotary interrupt relay 145; the relay 145 will not be able to reoperate. Thus, upon receipt of the busy tone the calling subscriber will proceed to hang up to release the equipment in a manner to be described.

Assuming however, that an idle toll trunk is encountered, such as 30, by the control wiper 197, the switch-through relay 110 will operate actuating its preliminary or "X" contacts first. The "X" contacts 117*a* open ground to relay 145 to prevent further operation thereby, while closing this ground at "X" contacts 117 to lock the switch-through relay 110 operated through its lower winding, via the winding of the rotary magnet 155 to battery. Rotary magnet 155 will not operate over this last mentioned circuit due to the resistance of the winding of relay 110. Thereafter, the remaining contacts of the switch-through relay 110 are actuated, whereby contacts 111 and 112 open the loop circuit to the line relay 120 and closes at contacts 111*a* and 112*a* the loop circuit to the toll trunk via wipers 195 and 196. Contacts 113 open the circuit to the relay 130. Contacts 114 close to extend ground from the seized toll trunk on a change of polarity via control wiper 197 to hold the preceding equipment in a well-known manner back over control conductor C 103. Contacts 116 close to provide an alternate holding circuit for the relay 110; the circuit extending from battery through the winding of rotary magnet 155, lower winding of relay 110, contacts 117, 116 upper winding of relay 110 to ground on control conductor C 105. Contacts 116*a* open the holding circuit to the relay 160. Relays 120, 130 and 160 will thus restore. The toll operator at position 85 upon answering will thus proceed to extend the toll call in a well-known manner.

*Calls to Sub-Exchange B*

Assuming that the subscriber at substation T1 in sub-exchange A desires to call a subscriber T2 in the small adjacent sub-exchange B. Either the calling subscriber must dial the four digits "2727" or the single digit "7" before dialing the remaining digits of the called party's directory number. As previously explained sub-exchange B is quite small, so it is desirable to absorb certain digits while maintaining a seven digit universal code. Local residents in exchange A may be aware that they can dial the single digit "7" and bypass the first three absorbed digits of the exchange B code, but a stranger or newcomer may not be aware of this fact, so that the first three digits would therefore be dialed and must be absorbed.

Assuming first the receipt of just the first four digits "2727" corresponding to the exchange B. Upon the seizure of the selector 100 by substation T1, the relays 120, 130 and 140 will all be operated as previously disclosed. Upon receipt of the first digit, the digit "2," the vertical magnet 150 will step the wipers 195–197 and 199 to their second vertical position in a manner previously described. Also the first vertical step taken by the wipers will close VON contacts 153 to complete the previously traced circuit to relay 145.

Upon the termination of the first digital impulse series the slow-to-release relay 140 will restore as previously described, and at contacts 144 will close a circuit to the release magnet 166. This circuit extending from ground contacts 136, 117*a*, 135, 144, 167, 162, vertical wiper 199, the second bank contact on the vertical bank 190, strap X, fifth terminals on terminal bar 185, contacts 178, contacts 4 and 3 on terminal bar 185 via strap U, conductor AR, winding of release magnet 166 to battery. The release magnet 166 energizes, closing contacts 168 to lock itself operated to the ground at contacts 136. Contacts 167 being part of a make-break arrangement with contacts 168, opens the original operating circuit for the release magnet 166. Contacts 169 close to complete a circuit to the marking relay 170; the circuit extending from ground contacts 131, 171, upper winding of relay 170, contacts 169 in series with the winding of the release magnet 166 to battery.

The marking relay 170 will close its preliminary or "X" contacts 174 first to close a locking circuit for itself via battery through its lower winding and contacts 116*a* and 136 to ground. In the meantime, the release magnet 166 will restore the wipers 195–197 and 199 to normal thereby restoring the VON springs, whereby; VON contacts 151 reopen, without effect however at this time; VON contacts 152 close to again reoperate relay 140; and VON contacts 153 opens the circuit to the rotary interrupt relay 145. Relay 140 in reoperating opens at contacts 144 the locking circuit to the release magnet 166. The resistance in the upper winding of the marking relay 170 is too high to permit the release magnet 166 to remain operated in series therewith, thus the release magnet 166 restores. At contacts 169 the release magnet 166 in restoring opens the original circuit for the relay 170, however relay 170 remains locked operated through its lower winding. Contacts 167 close to again prepare ground to the auxiliary wiper 199.

The marking relay 170 upon locking operated, thereafter operates its remaining contacts whereby the break-make before break contacts 171, 172 and 173 are operated to, open the original operating circuit to relay 170, remove dial tone and replace it with ground from contacts 131. Contacts 175 close to connect the eighth and ninth terminals of the terminal bar 185 together. Contacts 176 opens the connection between the seventh and eighth terminals of the terminal bar 185. Contacts 177 close to connect the fifth and sixth terminals of the terminal bar 185 together. Contacts 178 open the connection between the fourth and fifth terminals of the terminal bar 185. Thus, new markings have been placed on the terminal bar 185 namely battery to terminals 5 and 6 via strap V and relay 160, and battery to terminals 8 and 9 via strap T and the winding of the release magnet 166.

Upon the receipt of the second digit, the digit "7" the vertical magnet 166 will step the wipers 195–197 and 199 to the seventh vertical position in a manner previously described. As the termination thereof, the slow-to-release relay 140 will restore and close at contacts 144 ground to the auxiliary wiper 199 all as previously described. Release magnet 166 will energize from the ground on the auxiliary wiper 199 via the seventh bank contact on vertical bank 190, strap Y, eighth terminal on terminal bar 185, contacts 175, ninth terminal, strap T and conductor AR. The release magnet 166 in energizing locks operated by closing its contacts 168, and restores the wipers 195–197 and 199 to normal in a manner previously described. The VON contacts 152 reclose to again reoperate the relay 140, which in turn, opens contacts 144 to deenergize the release magnet 166 all as previously described. Also, VON contacts 153 opens the circuit to deenergize relay 145. Thus, the first two digits "27" have been absorbed.

Upon receipt of the third digit, the digit "2," the line relay 120 will pulse the vertical magnet 150 two times. The wipers will be stepped to the second vertical position, and after a short duration slow-to-release relay 140 will restore all as previously described. The ground on auxiliary wiper 199 will be closed to the upper winding of the relay 160 via the second vertical bank contact, strap X, the fifth terminal on terminal bar 185, contacts 177, strap V via the sixth and second terminal on terminal bar 185 and conductor A.

Relay 160 will energize to operate its "X" contacts only, closing "X" contacts 163 to extend the ground on wiper 199 to the release magnet 166. The "X" contacts 165 close to shunt the lower winding of relay 160 via contacts 163 and 136 to ground. This shunt on the lower winding of the relay 160 will prevent relay 160 from operating its remaining contacts. Release magnet 166 will energize, lock operated via its contacts 168 over a path previously described. The release magnet 166 will thus restore the wipers 195–197 and 199 to their normal position to reclose VON contacts 152 and reoperate relay 140 as previously described. When the release magnet 166 energizes, it also opens contacts 167 to remove the ground from the auxiliary wiper 199, thus both windings of relay 160 are now in series aiding via the "X" contacts 165. Relay 160 now operates its remaining contacts whereby, contacts 161 close ground to control wiper 197 via the upper winding of the switch-through relay 110 and conductor C 105. Contacts 162 opens the prepared ground to auxiliary wiper 199. Contacts 162*a* close to prepare a circuit to the rotary magnet 155, and contacts 164 further opens a prepared circuit to the release magnet 166. The reoperation of relay 140 will open contacts 144 to deenergize the release magnet 166.

Upon receipt of the fourth digit, the digit "7," the line relay 120 will pulse the vertical magnet 150 seven times to step the wipers 195, 196, 197 and 199 to their seventh vertical position as previously described. Upon the wipers taking their first vertical step the VON springs operate whereby VON contacts 151 close to prepare a circuit to the release magnet 166. VON contacts 152 opens the circuit to relay 140; and VON contacts 153 close the circuit to relay 145 all as previeously described. Relay 145 in operating closes at contacts 146 an alternate operating path bypassing the cam contacts 159. Contacts 147 close to prepare a circuit to the rotary magnet 155.

Upon the termination of the impulse series, the wipers will lie adjacent their seventh vertical position and after a short duration slow-to-release relay 140 will restore as previously described. At contacts 144 the restoration of relay 140 will close a circuit to the rotary magnet 155 over a circuit extending from ground, contacts 136, 117*a*, 135, 144, 167, 162*a*, 147, and winding of rotary magnet 155 to battery. Rotary magnet 155 and relay 145 will sequentially operate in a manner previously described to rotate the wipers 195, 196 and 197 in search of an idle fifth selector, such as fifth selector 50 in sub-exchange B. Upon the control wiper 197 engaging an idle fifth selector, battery will be returned over conductor C 105 to operate the switch-through relay 110 via the upper winding thereof to ground at contacts 161. The switch-through relay 110 will lock operated and switch the call through to the fifth selector in a manner previously described. The next digit will be directly responded to by the fifth selector in a manner well-known in the art to seize an idle connector, such as 55.

Assuming next that just a first digit "7" was dialed to make the above described call, upon receipt thereof the line relay 120 will pulse the vertical magnet 150 to step the wipers 195–197 and 199 to the seventh vertical position. Upon the wipers taking their first vertical step the VON springs are actuated whereby; VON contacts 151 close to prepare a circuit to the release magnet 166; VON contacts 152 opens the operating circuit to the relay 140; and VON contacts 153 close the previously traced circuit to the relay 145.

At the termination of the impulse series, the wipers will lie adjacent their seventh vertical position and the slow-to-release relay 140 will restore. At contacts 144 the relay 140 in releasing will close a circuit to the two-step relay 160. This last circuit extending from ground, contacts 136, 117*a*, 135, 144, 167, 162, auxiliary wiper 199, seventh bank contact on vertical bank 190, strap Y, eighth terminal on terminal bar 185, contacts 176, seventh and first terminal on terminal bar 185 via strap W, conductor CI, lower and upper windings of relay 160 to battery. Relay 160 operates closing its "X" contacts first whereby, "X" contacts 163 close without effect. "X" contacts 165 close to lock relay 160 operated via contacts 116*a*, and 136 to ground. Thereafter, the relay 160 operates its remaining contacts whereby contacts 161 close ground to the control wiper 197 via the upper winding of the switch-through relay 110. Contacts 162 open the ground to the auxiliary wiper 199, while closing this ground at contacts 162*a* to the rotary magnet 155 via contacts 147. Contacts 164 open a prepared circuit to the release magnet 166. The rotary magnet 155 and the rotary interrupt relay 145 will sequentially operate in a manner previously described to rotate the wipers 195, 196 and 197 in search of an idle fifth selector. Upon seizure of an idle fifth selector the switch-through relay 110 will operate, lock, and switch the call through in a manner previously described.

*Local Calls Within Sub-Exchange A*

As previously disclosed the sub-exchange A is a ten thousand line exchange therefore requiring or necessitating the absorption of two dialed digits on a local call. With the exchange having the directory code AB2, or more specifically, the digits "222" the first two digits "22" must be absorbed while cutting through on the third digit "2." It will thus be assumed that substation T1 will call T3.

Upon seizure of the selector 100 the relays 120, 130 and 140 are operated as previously described. Upon receipt of the first dialed digit, the digit "2," the line relay 120 will pulse the vertical magnet 150 two times to step the wipers 195, 197 and auxiliary wiper 199 to their second vertical position. Upon the wipers taking their first vertical step, the VON springs will operate whereby; VON contacts 151 close to prepare a circuit to the release magnet 166; VON contacts 152 open the operating circuit to the relay 140; and VON contacts 153 close the previously traced circuit to operate the relay 145.

Upon the termination of the impulse series, the wipers will lie adjacent their second vertical position, and after a short duration the slow-to-release relay 140 will restore as previously described. The restoration of the relay 140 will close at contacts 144 ground to the auxiliary wiper 199 over a previously traced circuit. This ground will close a circuit to the release magnet 166 via wiper 199, second bank contact on vertical bank 190, strap X, fifth terminal on terminal bar 185, contacts 178, terminals 4 and 3 of bar 185 via strap U, conductor AR, winding of the release magnet 166 to battery. The release magnet 166 energizes; opens the ground to the auxiliary wiper 199 at contacts 167; locks operated by closing contacts 168 over a previously traced path; closes at contacts 169 a circuit for the upper winding of the marking relay 170 in series with the release magnet 166 via contacts 171 and 131 to ground. The marking relay 170 closes its "X" contacts 174 first to lock relay 170 operated through its lower winding, and thereafter changes the markings on the terminal bar 185 in a manner previously described. The release magnet 166 will thus restore the wipers to normal, and restore the VON springs to normal to reoperate relay 140 and restore relay 145. At this time the relays 120, 130, 140 and 170 are operated.

Upon receipt of the second dialed digit, the digit "2" the line relay 120 will pulse the vertical magnet 150 two times to step the wipers to their second vertical level in a manner described above. However, in this case the ground appearing on the auxiliary wiper 199 will energize relay 160 over a circuit extending from wiper 199, second bank contact on the vertical bank 190, strap X, fifth terminal on the terminal bar 185, contacts 177, sixth and second terminal via strap V, conductor A, and upper winding of the two-step relay 160 to battery. Over this path the two-step relay 160 will energize sufficiently to operate its "X" contacts whereby; "X" contacts 163 close to extend the ground on conductor A to the release magnet 166; "X" contacts 165 close to shunt the upper windings of the relay 160 via ground from contacts 116*a* and 135. This shunt prevents the remaining contacts of the two-step relay 160 from operating.

The release magnet 166 energizes, locks operated by closing contacts 168. Contacts 167 open the ground to the auxiliary wiper 199 and the upper winding of the two-step relay 160, causing the windings of relay 160 to operate in series through "X" contacts 165. Relay 160 will thus operate its remaining contacts, closing contacts 161 to extend ground to the control wiper 197 via the upper winding of the switch-through relay 110. Contacts 162 open the ground to the auxiliary wiper 199, while closing the ground at contacts 162*a* to prepare a circuit to the rotary magnet 155. Contacts 164 open the circuit to the release magnet 166 however, the release magnet 166 locked energized to restore the wipers. The wipers restore before the second step operation of the two-step relay 160, and opens the VON contacts 153 to restore relay 145, which in turn opens contacts 147 to prevent energization of the rotary magnet 155. Also, VON contacts 152 close to reoperate relay 140 which further opens the rotary circuit by opening contacts 144.

Upon receipt of the third dialed digit, also the digit "2", the line relay 120 will pulse the vertical magnet 150 to step the wipers to the second vertical position as above described. When relay 140 restores at the termination of the impulse series, the circuit to the rotary magnet 155 is closed extending from ground contacts 136, 117*a*, 135, 144, 167, 162*a*, 147 and winding of rotary magnet 155 to battery. The rotary magnet 155 and the rotary interrupt relay 145 will sequentially operate and restore to rotate the wipers 195–197 over the second level of bank contacts in search of an idle local fourth selector, such as fourth selector 40. Upon wiper 197 finding an idle fourth selector, the cut through relay 110 will operate and switch the call through in a manner previously described. Subsequent dialed digits will be responded to by succeeding switches to complete the call in a manner well-known in the art, such as through the fifth selector 45 and the connector 46.

Although only the same three digits "222" have been described, it becomes obvious that any other same three digits, such as "333" or "444" could be used without departing from the scope of this invention.

Furthermore, although no strappings are shown connected to the remaining contacts on vertical bank 190, it is to be understood that strapping would exist here, connected as desired to correspond to other codes.

*Release*

The release of the selector 100 is initiated by the called party. When the called party releases, the switch train releases in a well-known manner. The holding ground is thus removed from control wiper 197 to restore the switch-through relay 110. The switch-through relay 110 upon restoring opens at contacts 111*a* and 112*a* the loop circuit to the succeeding equipment. Contacts 113 close ground via contacts 122, 133, 151 to the winding of the release magnet 166 and battery. Contacts 114 opens the holding ground to the preceding equipment for restoration thereof. The release magnet 166 energizes to restore the wipers to normal, thus restoring the VON springs. The VON contacts 151 open to deenergize the release magnet 166. Selector 100 is thus at normal.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a calling station, a selector switch, a switch train, means for extending a connection from said calling station to said selector switch, a switch-through relay in said selector for extending said connection to said switch train, a first means operated in response to the receipt of a first dialed digit over said connection for absorption thereof, a second means operated in response only to the receipt of a second dialed digit over said connection having the same numerical value as said first dialed digit for preparing the operation of said switch-through relay, and a third means operated in response only to the receipt of a third dialed digit over said connection having the same numerical value as said first and second dialed digit to operate said switch-through relay.

2. In a telephone system, a calling station, a selector switch including wipers therein, a switch train accessible by said wipers, means for extending a connection from said calling station to said selector switch, stepping means operated to step said wipers upon receipt of digital impulses over said connection, a switch through relay in said selector switch for extending a connection from said calling station to said switch train via said wipers, releasing means operated to restore said wipers subsequent only to the receipt of a first digit of a predetermined numerical value, preparatory means operated to prepare the operation of said switch through relay and reoperate said releasing means in response only to the receipt of a second digit of said same predetermined numerical value as said first digit and subsequent to said first digit, said preparatory means further operated by the reoperation of said releasing means for disabling said releasing means to a subsequent dialed digit, and means operating said switch through relay for extending said connection to said switch train upon receipt only of a third digit of said same predetermined numerical value as said first digit and said second digit and subsequent to said first and second digits.

3. A two-motion selector comprising a plurality of wipers and a plurality of contacts arranged in levels, trunks accessible by said wipers, an auxiliary wiper and an auxiliary bank of contacts including a first contact and a second contact, each contact individual to each of said levels, pulsing means for operating said auxiliary wiper to said auxiliary bank contact and said wipers to a corresponding level simultaneously, two-step means normally connected to a first contact on said auxiliary bank operated in response to said auxiliary wiper stepping to engage said first contact a first time prior to engaging any other auxiliary bank contact, switch-through means operated in response to the complete operation of said two-step means to extend a circuit connection to said trunk via said wipers, drop-back means normally connected to a second contact on said auxiliary bank and operated in response to said auxiliary wiper stepping to said second contact a first time prior to engaging any other auxiliary bank contact for dropping back said wipers and said auxiliary wiper to normal, marking means operated in response to a first operation of said drop-back means for connecting said two-step means to said second contact and connecting said drop-back means to said first contact, said drop-back means operated to drop-back said wipers in response to said auxiliary wiper engaging said first contact subsequent to the operation of said marking means, said two-step means partially operated to prepare the operation of said switch-through means in response to said auxiliary wiper engaging said second contact subsequent to the previous successive engagements of said second and first contacts respectively, said drop-back means partially operating said two-step means for dropping back said wipers and auxiliary wiper to normal, and said switch-through means in response to said auxiliary wiper engaging said first contacts subsequent to the previous successive engagements of said second and first and second contacts respectively for permitting extension of said connection to said trunks.

4. A two-motion selector as claimed in claim 3, including a terminal bar adjacent said auxiliary bank including strappings therebetween for extending the connections to said two-step means and said drop-back means, and other strappings connected to said terminal bar for altering the path to said two-step and said drop-back means in response to the operation of said marking means.

5. A two-motion selector as claimed in claim 3, including secondary means operated in response only to the complete operation of said two-step means for stepping said wipers in a secondary direction in search of an idle trunk, whereby said switch through relay operates in response to the engagement of an idle trunk by said wipers for extending said connection thereto.

6. A two-motion selector comprising a plurality of wipers and a plurality of contacts arranged in levels including a first contact and a second contact, a plurality of trunks accessible by said wipers, an auxiliary wiper and an auxiliary bank of contacts having a contact individual to each of said levels, pulsing means for operating said auxiliary wiper to an auxiliary bank contact and said wipers to a corresponding level simultaneously, two-step means normally connected to said first contact on said auxiliary bank over a first circuit and taking a first and second stepping operation in response to said auxiliary wiper stepping to engage said first contact a first time prior to engaging any other auxiliary bank contact, switch through means operated in response to the complete operation of said two-step means to extend circuit connections to said trunks via said wipers, drop-back means normally connected to said second contact on said auxiliary bank and operated in response to said auxiliary wiper stepping to said second contact a first time prior to engaging any other auxiliary bank contact for dropping back said wipers and said auxiliary wiper to normal, marking means operated in response to a first operation of said drop-back means for connecting said two-step means over a second circuit to said second contacts and connecting said drop-back means to said first contact, said drop-back means operated to drop-back said wipers in response to said auxiliary wiper engaging said first contact subsequent to the operation of said marking means, said two-step means operating a first step over said second circuit to prepare the operation of said switch-through means and shunting itself to prevent operation of said two-step means to its second step in response to said auxiliary wiper engaging said second contacts subsequent to the previous successive engagements of said second and first contacts respectively, said drop-back means operated in response to the partial operation of said two-step means for dropping back said wipers and auxiliary wiper to normal and for opening said second circuit to cause said two-step relay to take said second step operation via a third circuit including said shunt, starting the operation of said switch-through means upon said auxiliary wiper engaging said first contact a subsequent time.

7. In a telephone system, a calling station, a two-motion selector switch, a switch train, a plurality of wipers including an auxiliary wiper and an auxiliary contact bank, means for extending a connection from said calling station to said selector switch, pulsing means in said selector switch in response to dialed digits received over said connection for stepping said wipers to a level of bank contacts and said auxiliary wiper to a corresponding contact on said auxiliary contact bank, switch through means operated in response to said auxiliary wiper engaging a first contact on said auxiliary bank in response to the receipt of a first dialed digit for extending a circuit connection to said switch train via said wipers, marking means operated in response to said auxiliary wiper engaging a second contact on said auxiliary bank in response to the receipt of a first dialed digit for preventing the extension of said circuit connection upon an immediate subsequent dialed digit which would cause said auxiliary wiper to engage said first contact, drop-back means operated in response to said auxiliary wiper engaging said second contact for dropping back said wipers and auxiliary wiper to normal each time upon receipt of a first and second dialed digit, and preparing means operated in response to said auxiliary wiper engaging said second contact said second consecutive time for initiating said switch through means operated in response to said auxiliary wiper engaging said second contact upon receipt of a third dialed digit.

8. In a telephone system as claimed in claim 7, wherein said drop-back means is effective to drop-back said wipers and auxiliary wiper to normal in response to the consecutive engagements of said second contact and said first and second contacts respectively and successively upon receipt of three consecutively dialed digits, and said preparing means operated thereafter for initiating said switch-through means for operation in response to said auxiliary wiper engaging said first contact subsequent thereto upon receipt of a fourth dialed digit.

9. In a telephone system as claimed in claim 8, including secondary means operated in response to the initiation of said switch-through means for operating said wipers in a secondary direction to seize an idle switch in said switch train, and said switch-through means operated upon said seizure for extending said connection thereto.

References Cited in the file of this patent

UNITED STATES PATENTS

| | | |
|---|---|---|
| 2,291,481 | McDavitt | July 28, 1942 |
| 2,513,400 | Carson | July 4, 1950 |
| 2,642,498 | Riddell et al. | June 16, 1953 |
| 2,658,949 | Pharis | Nov. 10, 1953 |
| 2,854,515 | Pharis | Sept. 30, 1958 |
| 2,859,281 | Quatman | Nov. 4, 1958 |